United States Patent
Underwood et al.

[11] Patent Number: 5,498,206
[45] Date of Patent: Mar. 12, 1996

[54] RETHRESHING ROTOR FOR GRAIN COMBINE

[75] Inventors: Mark R. Underwood, Burr Oak; Sushil V. Dwyer, Arkansas City, both of Kans.

[73] Assignee: Deere & Company, Moline, Ill.

[21] Appl. No.: 287,138

[22] Filed: Aug. 8, 1994

[51] Int. Cl.$^6$ ............................................. A01F 12/52
[52] U.S. Cl. ............................................. 460/14; 460/119
[58] Field of Search ............................ 460/14, 12, 13, 460/119, 76

[56] References Cited

U.S. PATENT DOCUMENTS

| | | |
|---|---|---|
| 2,309,736 | 2/1943 | Makin . |
| 2,875,768 | 3/1959 | Belkowski et al. . |
| 3,115,142 | 12/1963 | Kepkay . |
| 3,247,855 | 4/1966 | Kepkay . |
| 4,062,366 | 12/1977 | De Coene . |
| 4,292,981 | 10/1981 | De Busscher et al. . |
| 4,310,004 | 1/1982 | De Busscher et al. . |
| 4,441,511 | 4/1984 | Schroeder .................. 460/13 |
| 4,489,733 | 12/1984 | Underwood . |
| 4,884,993 | 12/1989 | Hemker et al. . |

Primary Examiner—Terry Lee Melius
Attorney, Agent, or Firm—James E. Bradley; Mark W. Handley

[57] ABSTRACT

A grain combine according to the present invention includes a primary threshing rotor which rotates to thresh grain from crop, a sieve section for separating grain from chaff, a clean grain conveyor, a clean grain storage bin, and a rethreshing section for rethreshing tailings. The rethreshing section has a rethreshing rotor which receives the tailings from the sieve section. The rethreshing rotor extends completely across an end of the sieve section for rotating about an axis which extends in parallel to the end of the sieve section. The rethreshing rotor includes rasp bars which extend along the end of the sieve section for receiving the tailings and pressing the tailings against a rethreshing pan. In a preferred embodiment, blowers are provided for removing loose chaff from the tailings in the rethreshing section. The rethreshed tailings, including clean grain separated from the tailings by rethreshing, are returned to the primary rotor for rethreshing.

19 Claims, 3 Drawing Sheets

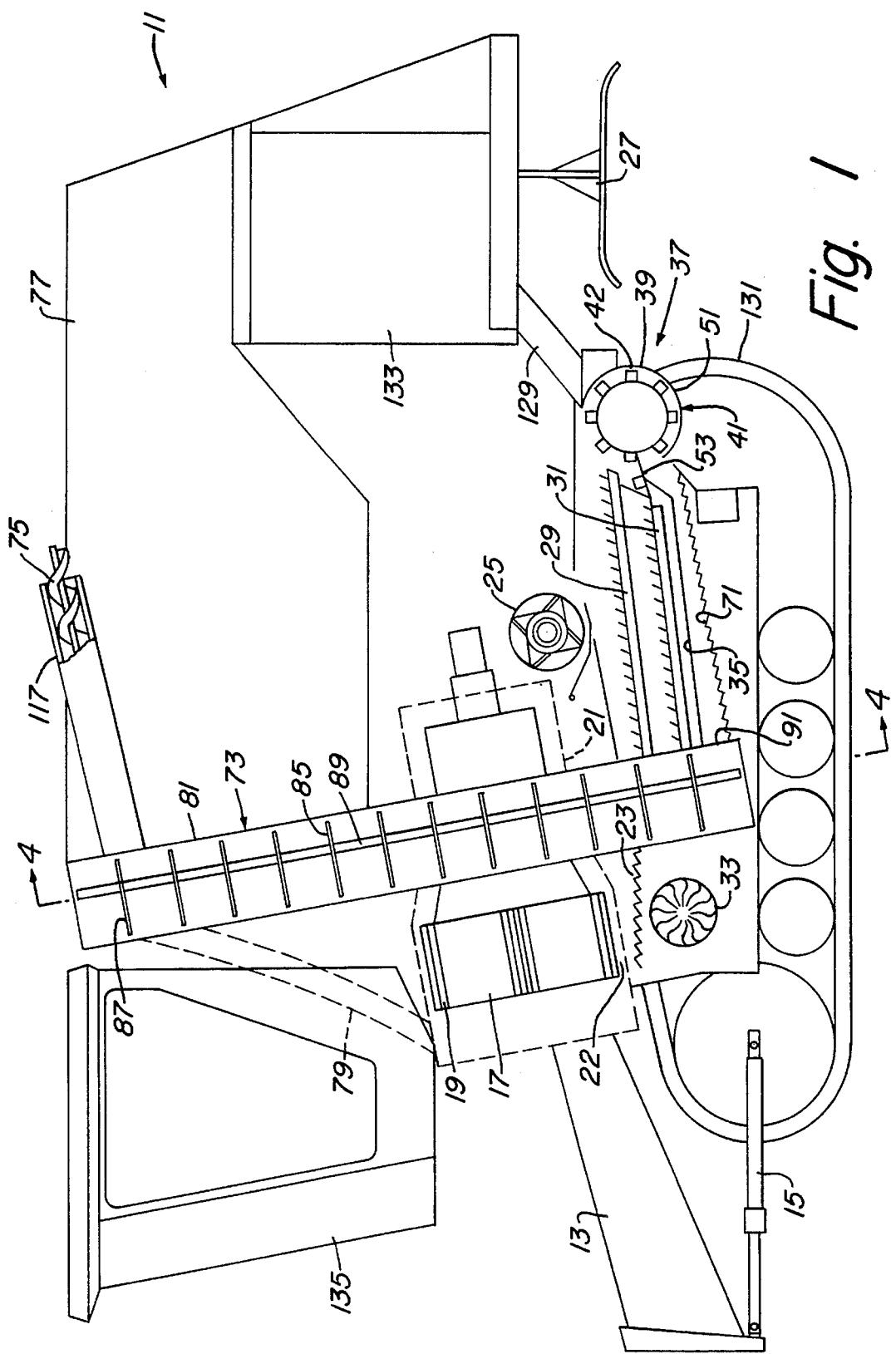

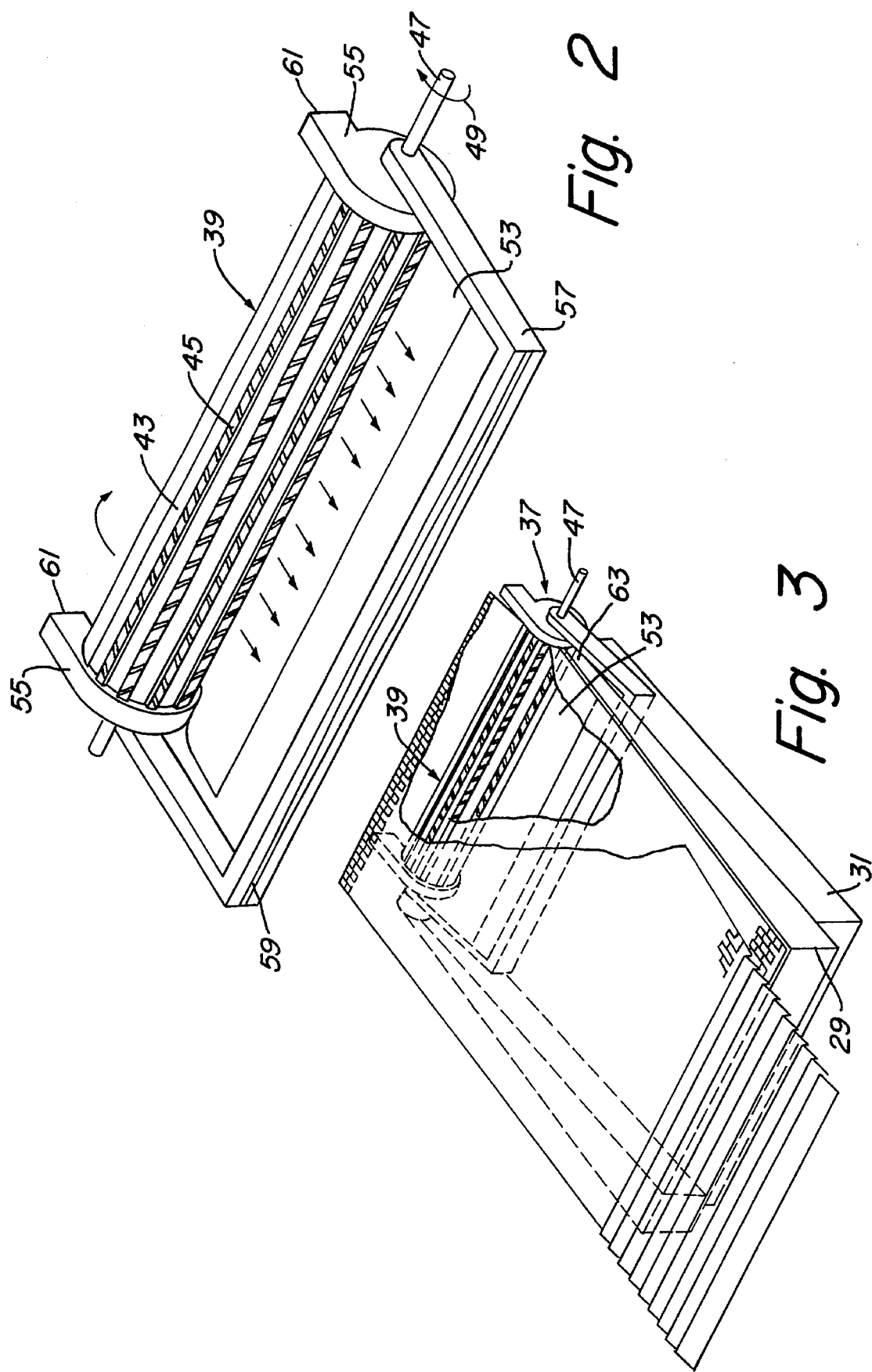

RETHRESHING ROTOR FOR GRAIN COMBINE

BACKGROUND OF THE INVENTION

1. Field of the Invention

This invention relates in general to grain harvesting combines, and in particular to a rethreshing rotor for rethreshing tailings from the sieve section of a grain combine.

2. Description of the Prior Art

A grain harvesting combine has a header which cuts the crop and feeds it upward into a threshing rotor. The threshing rotor rotates within a perforated housing, passing grain within clearances between the threshing rotor and perforated housing to thresh grain from the crop. The threshed grain falls through the perforations onto a grain pan, and from the grain pan onto a set of upper and lower sieves. The sieves are oscillating, causing clean grain to fall through for collection. A blower blows air upward through the sieves, discharging chaff to the rear. Straw from the threshing chamber proceeds through a straw beater and out the rear of the combine.

The clean grain is collected and conveyed to the bin. Incompletely threshed grain will not proceed through the fingers of the sieves, yet is too heavy to be blown out the rear along with the chaff. This grain, called "tailings" or "returns" is often returned to the rotor for rethreshing. However, when tailings are returned to the rotor for rethreshing, under some grain conditions, called "white caps", tailings will pass through the rotor yet again without the grain separating from the chaff.

Some prior art grain harvesting combines have rethreshing rotors for receiving tailings from the sieves, rethreshing the tailings, and passing the tailings back through a primary rotor for rethreshing. However, these prior art tailings rethreshers typically have only a narrow width, and receive tailings from an auger which passes along an end of the sieves.

SUMMARY OF THE INVENTION

A grain combine according to the present invention includes a primary threshing rotor which rotates to thresh grain from crop, a sieve section for separating grain from chaff, a clean grain conveyor, a clean grain storage bin, and a rethreshing section for rethreshing tailings. The rethreshing section has a rethreshing rotor which receives the tailings from the sieve section. The rethreshing rotor extends completely across an end of the sieve section for rotating about an axis which extends in parallel to the end of the sieve section. The rethreshing rotor includes rasp bars which extend along the end of the sieve section for receiving the tailings and pressing the tailings against a rethreshing pan. In a preferred embodiment, blowers are provided for removing loose chaff from the tailings in the rethreshing section. The rethreshed tailings, including clean grain separated from the tailings by rethreshing, are returned to the primary rotor for rethreshing.

BRIEF DESCRIPTION OF THE DRAWINGS

FIG. 1 is a schematic sectional view of a combine constructed in accordance with the present invention illustrating the major components;

FIG. 2 is a perspective view depicting the rethreshing rotor of FIG. 1, along with optional blowers and suction plenum for moving chaff separated from the tailings by the rethreshing rotor;

FIG. 3 is a perspective view depicting a rethreshing section of the present invention extending along an end of the sieve sections of FIG. 1.

DETAILED DESCRIPTION OF THE PREFERRED EMBODIMENT

Figure 4:
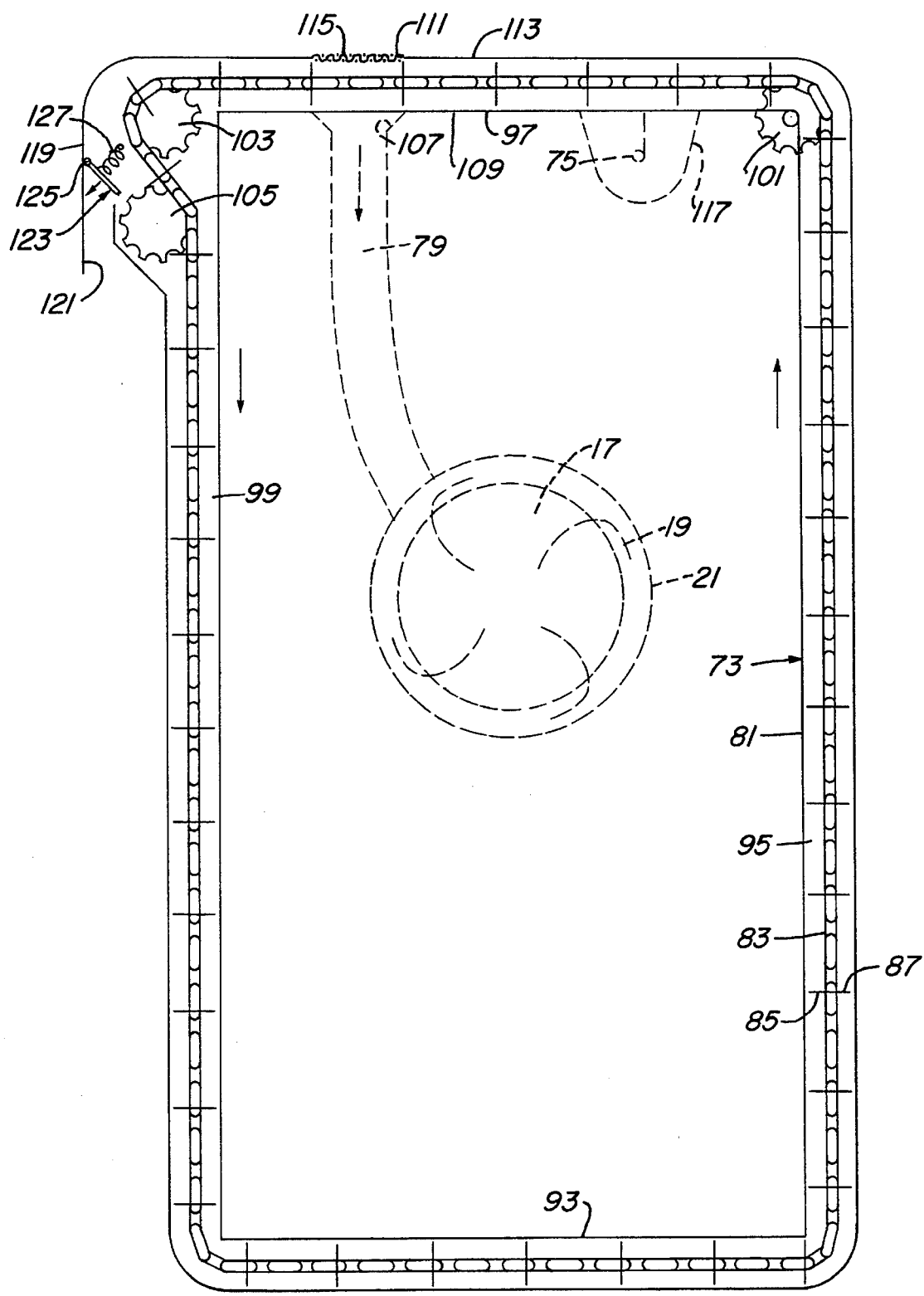
FIG. 4 is a schematic sectional view of an elevator system for the combine of FIG. 1, taken along section line 4—4 of FIG. 1.

Referring to FIG. 1, combine 11 has a header support 13 which will secure to a conventional header (not shown) for cutting grain. Header support 13 will pivot upward and downward by means of hydraulic cylinders 15 to control the height of the cut. The header has a sickle which cuts the crop and feeds it upward through the header support 13 to primary rotor 17. Rotor 17 is oriented axially and is driven rotatably. Rotor 17 has a set of impeller blades 19 on its forward end for drawing the crop in and threshing the crop. Rotor 17 is rotated within a perforated housing 21. In the preferred embodiment, housing 21 is also rotated in the same direction, but at a lesser speed.

Grain which is threshed in the clearances between housing 21 and rotor 17 falls through the perforations onto a shoe 23. The grain will move down the shoe in a rearward direction onto sieves 29, 31. The straw from the crop is discharged out the rearward end of the housing 21 into a transverse beater 25 and out the rear end of combine 11. A rotating spreader 27 spreads the straw on the ground.

Sieves 29, 31 are rectangular members that oscillate back and forth. Sieves 29, 31 have a plurality of fingers which define apertures for the properly threshed grain to fall through. A blower 33 blows air upward through the sieves 29, 31 and out the rear of combine 11. Chaff will be blown outward along with the air.

The clean grain falls through sieves 29, 31 onto an inclined clean grain pan 35. Grain which is only partially threshed and thus will not fall through the openings in the sieves 29, 31 will fall down into a rethreshing section 37 for subsequent rethreshing, because it is too heavy to be blown out with the chaff.

Rethreshing section 37 includes rethreshing rotor 39 which rotates within housing 41. Gap 42 between rethreshing rotor 39 and housing 41 can be selectively adjusted by moving housing 41 either towards or away from rotor 39. Selecting gap 42 defines clearances between rotor 39 and housing 41 for controlling the yield and throughput for rethreshing a particular crop. Rethreshing yield is increased by decreasing gap 42 so that more clean grain is separated from tailings. However, decreasing gap 42 to increase yield decreases throughput since clearances are reduced. Thus, gap 42 should be set for particular crops to counterbalance throughput verses yield for rethreshing tailings.

Referring to FIG. 2, rethreshing rotor 39 includes cylinder 43 having a longitudinal length along which rasp bars 45 extend between the longitudinal ends of rotor 39. Rethreshing rotor 39 rotates about shaft 47 in direction 49. Housing 41 (shown in FIG. 1) includes rethreshing pan 51 (shown in FIG. 1) having a concave portion against which rethreshing rotor 39 presses tailings. Concave pan 51 is solid, not perforated. Discharge 53 is provided for discharging rethreshed tailings from rethreshing section 37 in a forward direction.

Two blowers 55, which are optional, are provided at opposite ends of rotor 39 for removing chaff which is separated from grain during rethreshing of tailings in rethreshing section 37. Suction plenum 57 is provided with inlet 59 through which blowers 55 draw air for removing chaff and exhausting the air and chaff through exhaust 61. Suction plenum 57 is located forward of rethreshing rotor 39 and extends the full width of rotor 39. Suction plenum 57 has two ducts, one on each side, that lead to blowers 55.

Referring to FIG. 3, rethreshing section 37 is shown aligned across an end of upper sieve 29 and a lower sieve 31. Rethreshing section 37 extends all the way across an end of upper sieve 29 and lower sieve 31. Rethreshing rotor 39 rotates about shaft 47, which extends in parallel to the end 63 of upper sieve 29. It should be noted that end 63 of upper sieve 29 extends across the width of combine 11 (shown in FIG. 1). Discharge 53 passes rethreshed tailings from rethreshing section 37. In the preferred embodiment shown, discharge 53 conveys the rethreshed grain onto tailings pan 71. The tailings should be fully threshed at this point.

Referring again to FIG. 1, tailings pan 71 is located below the clean grain pan 35. An elevator 73 will transport the clean grain from the clean grain pan 35. A separate section of elevator 73, as explained below, also will transport the tailings from the tailings pan 71 back to the rotor 17, even though the tailings may not need rethreshing. The clean grain proceeds up elevator 73 where it is delivered to an auger 75 which distributes the clean grain rearward back into a large storage bin 77. The remaining tailings are carried by elevator 73 up to a chute 79. The tailings flow down the chute 79 and back through the clearances 22 between rotor 17 and housing 21. The tailings on return to sieves 29, 31 will for the most part fall through onto clean grain pan 35 for transport to storage bin 77.

Elevator 73 includes an elevator housing 81, which is a generally rectangular metal member. Housing 81 extends completely around combine 11, below the sieves 29, 31, above the forward portion of bin 77, and along each side. A chain or drive linkage 83 (shown in FIG. 4) extends continuously through elevator housing 81. Tailings paddles 85 are mounted to one side of chain 83 for movement therewith. On the other side, clean grain paddles 87 mount to chain 83 (shown in FIG. 4). The spaces between the paddles 85, 87 provide compartments for transporting rethreshed tailings and clean grain. Paddles 87 are preferably about 50% greater in width than tailings paddles 85. This results in greater volume compartments for the clean grain than for the tailings. Chain 83 (shown in FIG. 4) passes through a guide 89, which is a partition or wall with a slot through it which extends completely around the elevator housing 81. Guide 89 prevents clean grain in the clean grain compartments from entering the tailings compartments, and vice versa. The rethreshed tailings enter the tailings side of the elevator housing 81, which is the rearward side, through an opening 91 that registers with the lower end of tailings pan 71. Clean grain pan 35 delivers the grain over the tailings side of elevator housing 81 and into an opening (not shown) that drops the grain into the compartments between the clean grain paddles 87.

Referring to FIG. 4, elevator housing 81 is generally rectangular in cross-section. Lower section 93 extends below sieves 29, 31 (shown in FIG. 1) for collecting the clean grain and tailings. The ascending section 95 extends upward at a right angle to lower section 93. Upper section 97 is parallel to lower section 93 and extends over the forward portion of bin 77 (shown in FIG. 1). Descending section 99 is parallel to ascending section 95. The direction of movement of chain 83 is indicated by the arrows, and is counterclockwise when viewed rearward as indicated by the Section 4—4 of FIG. 1.

Chain 83 is guided by stationary guide shoes (not shown) at the lower corners. A guide sprocket 101 guides chain 83 at the junction of the ascending section 95 with upper section 97. A drive sprocket 103 locates at the junction with upper section 97 and descending section 99. A guide sprocket 105 which serves to adjust tension is located directly below drive sprocket 103. Guide sprockets 101 may alternately be a stationary guide shoes. Drive sprocket 103 is driven by the combine drive system.

The tailings chute entrance 107 comprises an opening leading to chute 79, which leads back to housing 21 and rotor 17.

Entrance 107 is in the lower wall 109 of the upper section 97 of elevator housing 81. A window 111 is located directly above chute entrance 107 in the upper wall 113 of the upper section 97 of elevator housing 81. Window 111 extends only over the tailings section of elevator housing section 81 above tailings paddles 85. It does not extend over the clean grain paddles 87. Preferably for safety and to avoid debris, window 111 has a screen 115. The impeller blades 19 of rotating rotor 17 create air movement. The window 111 cooperates with the blades 19 to cause a suction or downdraft that is indicated by the arrow in FIG. 4 illustrated within chute 79.

Referring still to FIG. 4, the clean grain auger 75 is carried in an auger housing 117 which mounts to the lower wall 109 and extends rearward. An opening (not shown) in lower wall 109 discharges clean grain from the clean grain section into auger housing 117.

A jammed crop chamber 119 is located at the junction of the upper section 97 with the descending section 99 of elevator housing 81. Under certain conditions, debris contained with the rethreshed tailings and clean grain is carried upward by the elevator 73. This debris may not be able to enter the auger housing 117 or the tailings chute 79 because of its size or stringiness. Possibly, clean grain may not be properly moved out the auger 75 due to a malfunction or jamming. The jammed crop chamber 119 is located downstream of the clean grain auger housing 117 and tailing chute 79 to accommodate any product left in the clean grain and tailings compartments. It is an enlarged area, about twice the lateral width of the remaining portion of elevator housing 81. The jammed crop chamber 119 contains both the drive sprocket 103 and the tension sprocket 105. Jammed crop chamber 119 has a lower discharge opening 121 which faces downward.

A trap door 123 is located above and normally closes opening 121. Trap door 123 has means for sensing if a build-up of product exists in jammed crop chamber 119. Preferably this comprises a hinge 125 which allows trap door 123 to swing from the closed position shown to an open position, indicated by the arrow. A spring 127, schematically shown, provides a bias to prevent door 123 from swinging to the open position unless sufficient crop build-up occurs. The build-up of crop will press against door 123, and when the force overcomes the bias of spring 127, door 123 opens, allowing the jammed crop to flow out and onto the ground. If the product passing through the discharge chamber 119 is not sufficient to push door 123 open, the product returns down the descending section 99.

Referring again to FIG. 1, other components of combine 11 include a frame 129 which is mounted in this embodiment on rubber tracks 131. The rubber tracks 131 could be replaced by wheels. An engine 133 supplies power for the tracks 131 as well as the various moving components in combine 11. The operator operates combine 11 from a cab 135.

In operation, the operator will connect header support 13 to a header for cutting grain. The header will sever the crop and pass it up the header support 13 into rotating housing 21. The rotating rotor 17 within the rotating housing 21 threshes the crop. Its straw will be drawn rearward by beaters 25 and distributed by straw spreaders 27.

Clean grain falls through perforations in housing 21 onto shoe 23. The grain proceeds onto the upper sieve 29. The clean grain will fall through apertures in the upper sieve 29, lower sieve 31 and onto clean grain pan 35. Blower 33 discharges air through sieves 29, 31, blowing chaff out the rear of combine 11. Partially threshed tailings fall off the rearward end of the upper sieve 29 and into rethreshing section 37.

Rethreshing rotor 39 rotates to thresh tailings within housing 41. Chaff is removed from the rethreshed tailings by blowers 55. In the preferred embodiment of the present invention, the rethreshed tailings, including the clean grain separated by rethreshing in rethreshing section 37, are returned to tailings pan 71, and then to primary rotor 17 for rethreshing.

Elevator 73 is continuously moving to transport clean grain to storage bin 77 and rethreshed tailings to chute 79. Grain from clean grain pan 35 and shoe 23 will fall into the clean grain compartments between paddles 87 and will be elevated up to auger 75. Auger 75 will discharge the clean grain into storage bin 77. Rethreshed tailings from tailing pan 71 will enter tailings compartments between tailings paddles 85 and be elevated up to chute 79. As shown in FIG. 4, a downdraft is created due to window 111 and impeller blades 19, facilitating the downward flow of rethreshed tailings. The rethreshed tailings pass through rotor 17 and onto ripple shoe 23. The rethreshed tailings should then pass through sieves 29, 31 as clean grain.

Referring to FIG. 4, should product fail to proceed down chute 79 or out auger 75, it will move down the descending section 99 for subsequent transport again. Should too much product build up for whatever reason in the stuck crop chamber 119, trap door 123 will open to discharge the jammed product out the discharge opening 121 onto the ground. The jammed product could comprise tailings as well as clean grain.

In alternative embodiments (not shown), rethreshed grain may be passed from discharge 53 directly into clean grain pan 35 to be transported to storage bin 77. Additionally, in other embodiments of the present invention, the rethreshed grain may be conveyed from discharge 53 to ripple shoe 23 for further separation by sieves 29, 31.

The present invention has several advantages over prior art grain combines. First, the rethreshing section of the present invention allows for smaller clearances between the rethreshing rotor and rethreshing pan than can be achieved between the primary threshing rotor and perforated housing without reducing throughput, and thus adversely affecting the rate at which grain can be harvested. Since the clearances between the rethreshing rotor and rethreshing pan may be significantly reduced, as compared to the clearances between the primary threshing rotor and perforated housing, more effective rethreshing can be achieved. Additionally, the rethreshing rotor of the present invention extends all the way across an end of the upper sieve so that the rethreshing rotor is long enough to provide a high enough throughput of tailings passing through reduced clearances in the rethreshing section than is possible with shorter rethreshing rotors at these reduced clearances. Further, tailings are fed directly into the rethreshing rotor, reducing number of moving parts which would be required by additional augers and other conveying means for passing tailings to the rethreshing rotor.

Although the invention has been described with reference to a specific embodiment and several alternative embodiments, this description is not meant to be construed in a limiting sense. Various modifications of the disclosed embodiments as well as other alternative embodiments of the invention will become apparent to persons skilled in the art upon reference to the description of the invention. It is therefore contemplated that the appended claims will cover any such modifications or embodiments that fall within the true scope of the invention.

We claim:

1. In a grain combine having a primary threshing rotor which rotates to thresh grain from crop, a sieve section which separates chaff and tailings from the grain received from the primary threshing rotor, a storage bin, and a clean grain conveyor means for transporting clean grain which passes through the sieve section to the storage bin, the improvement comprising:

a rethreshing rotor for rotating about an axis of rotation which extends substantially parallel to a rearward end of the sieve section, the rethreshing rotor having a length which substantially extends completely across the rearward end of the sieve section and is adjacent to the rearward end of the sieve section for receiving the tailings from the rearward end of the sieve section;

a rethreshing pan substantially extending completely across the rearward end of the sieve section, and having a concave portion against which the rethreshing rotor presses the tailings to rethresh the tailings; and a discharge section for passing the tailings from the rethreshing pan after rethreshing.

2. The grain combine of claim 1, wherein the grain combine further comprises:

tailings conveyor means for conveying rethreshed grain from the discharge section of the rethreshing rotor to the primary threshing rotor for rethreshing.

3. The grain combine of claim 1, further comprising:

a suction plenum extending forward of the rethreshing rotor and across a forward end of the rethreshing pan; and blowers which are mounted to opposite ends of the rethreshing rotor for rotation therewith to separate the chaff from rethreshed grain.

4. The grain combine of claim 1, wherein the grain combine further includes:

a tailings pan located below the sieve section, the tailings pan being positioned adjacent to the discharge section to receive rethreshed grain from the discharge section; and tailings conveyor means for conveying rethreshed grain from the tailings pan for rethreshing.

5. The grain combine of claim 1, wherein the discharge section directs the tailings from the rethreshing pan, after rethreshing by the rethreshing rotor, to a tailings pan for returning to the primary threshing rotor for passing through the primary threshing rotor again.

6. In a grain combine having a primary threshing rotor which rotates to thresh grain from crop, a sieve section which separates chaff and tailings from grain received from the primary threshing rotor, a storage bin, and a clean grain conveyor which transports the grain which passes through the sieve section to the storage bin, the improvement comprising:

a rethreshing rotor for rotating about an axis of rotation which extends parallel to a rearward end of the sieve section for rethreshing the tailings, the rethreshing rotor having a length which substantially extends completely across the rearward end of the sieve section and is adjacent to the rearward end of the sieve section, for receiving tailings which fail to pass through the sieve section;

a rethreshing pan substantially extending completely across the rearward end of the sieve section, and having a solid, unperforated concave portion against which the rethreshing rotor presses the tailings to rethresh the tailings; and a discharge section joining the rethreshing pan for passing the tailings from the rethreshing pan after rethreshing.

7. The grain combine of claim 6, further comprising:

rethreshing rasp bars included as part of the rethreshing rotor, the rethreshing rasp bars substantially extending completely across the length of the rethreshing rotor for moving the tailings along the rethreshing pan and rethreshing the tailings.

8. The grain combine of claim 6, further comprising:

tailings conveyor means for conveying rethreshed grain from the discharge section of the rethreshing rotor to the primary threshing rotor for rethreshing.

9. The grain combine of claim 6, further comprising:

a suction plenum extending forward of the rethreshing rotor and across a forward end of the rethreshing pan; and blowers which are mounted to opposite longitudinal ends of the rethreshing rotor for rotation therewith to draw air through the suction plenum to separate the chaff from rethreshed grain.

10. The grain combine of claim 6, further comprising:

rethreshing rasp bars included as part of the rethreshing rotor, the rethreshing rasp bars substantially extending completely across the length of the rethreshing rotor, parallel to the axis of rotation of the rethreshing rotor, for moving tailings along the rethreshing pan and rethreshing the tailings;

a suction plenum extending forward of the rethreshing rotor and across a forward end of the rethreshing pan and blowers which are mounted to opposite longitudinal ends of the rethreshing rotor for rotation therewith to draw air through the suction plenum to separate the chaff from rethreshed grain.

11. In a grain combine having a primary threshing rotor which rotates to thresh grain from crop, a sieve section which separates chaff and tailings from the grain received from the primary threshing rotor, a storage bin, a clean grain conveyor which transports the grain which passes through the sieve section to the storage bin, and a tailings conveyor which transports partially threshed tailings which fail to pass through the sieve section to a chute located above the primary threshing rotor, the tailings moving through the chute into the primary threshing rotor for rethreshing, the improvement comprising:

a rethreshing rotor having a length which substantially extends completely across a rearward end of the sieve section, wherein the rethreshing rotor is positioned adjacent to the rearward end of the sieve section for directly receiving the tailings from the sieve section and rotating about an axis of rotation which extends parallel to the rearward end of the sieve section for rethreshing the tailings prior to passing the tailings through the primary threshing rotor for a second passage therethrough;

a rethreshing pan extending transversely within the grain combine, substantially across the rearward end of the sieve section, and having a concave portion against which the rethreshing rotor presses the tailings to rethresh the tailings; and a discharge section for discharging at least part of the tailings which are rethreshed from the rethreshing pan and to the tailings conveyor for transport to the chute and the primary rethreshing rotor.

12. The grain combine of claim 11, further comprising:

rethreshing rasp bars included as part of the rethreshing rotor, the rethreshing rasp bars substantially extending completely across the length of the rethreshing rotor for moving tailings along the rethreshing pan and for rethreshing the tailings.

13. The grain combine of claim 11, wherein the concave portion of the rethreshing pan is solid and free of perforations.

14. The grain combine of claim 11, wherein the grain combine further comprises:

a suction plenum located forward of the rethreshing rotor, extending the full width of the rethreshing rotor, and having an inlet for drawing air into the suction plenum and across the rethreshed tailings;

two ducts which extend from opposite sides of the suction plenum, rearward to opposite longitudinal ends of the rethreshing rotor, for passing air rearward from the suction plenum; and blowers which are mounted at rearward ends of the two ducts, on opposite longitudinal ends of the rethreshing rotor, for rotating with the rethreshing rotor to draw air through the suction plenum and the two ducts for separating the chaff from rethreshed grain.

15. The grain combine of claim 11, further comprising:

rethreshing rasp bars included as part of the rethreshing rotor, the rethreshing rasp bars substantially extending completely across the length of the rethreshing rotor, parallel to the longitudinal axis of rotation, for moving tailings along the rethreshing pan and rethreshing the tailings;

a suction plenum located forward of the rethreshing rotor, extending the full width of the rethreshing rotor, and having an inlet for drawing air into the suction plenum and across the rethreshed tailings; and blowers disposed on opposite longitudinal ends of the rethreshing rotor for drawing air through the suction plenum and removing chaff from the rethreshing pan.

16. In a method for threshing grain with a grain combine of the type having a primary threshing rotor which rotates to thresh grain from crop, a sieve section which separates chaff and tailings from the grain received from the primary threshing rotor, a storage bin, and a clean grain conveyor which transports the grain which passes through the sieve section to the storage bin, the method comprising the steps of:

providing a rethreshing rotor and a rethreshing pan which are adapted for selectively positioning one with respect to the other with clearances defined therebetween, the rethreshing rotor substantially extending completely across and adjacent to a rearward end of the sieve section for receiving tailings from the sieve section, and the rethreshing pan having a concave section which also substantially extends completely across the rearward end of the sieve section, wherein the rethreshing rotor is rotatably secured for rotating to press the tailings against the concave section of the rethreshing pan to rethresh the tailings;

passing the tailings from the sieve section, and into the clearances disposed between the rethreshing rotor and the rethreshing pan to rethresh the tailings into rethreshed grain; and conveying the rethreshed grain from the rethreshing pan after rethreshing and to the storage bin.

17. The method of claim 16 wherein the step of conveying the rethreshed grain comprises the steps of:

passing the rethreshed grain from the rethreshing rotor to a tailings conveyor;

conveying the rethreshed grain through the tailings conveyor and back to the primary threshing rotor;

passing the rethreshed grain through the primary threshing rotor, and back to the sieve section; and passing the rethreshed grain through the sieve section and to the clean grain conveyor, which transports the rethreshed grain to the storage bin.

18. The method of claim 16, wherein the step of conveying the rethreshed grain comprises the steps of:

passing the rethreshed grain from the rethreshing rotor, down a tailings pan located below the sieve section, and to a tailings conveyor;

conveying the rethreshed grain through the tailings conveyor and back to the primary threshing rotor;

passing the rethreshed grain through the primary threshing rotor, and back to the sieve section; and passing the rethreshed grain through the sieve section and to the clean grain conveyor, which transports the rethreshed grain to the storage bin.

19. The method of claim 16, further comprising the steps of:

providing a suction plenum which extends forward of the refreshing rotor, and blowers which are mounted to opposite longitudinal ends of the rethreshing rotor for rotating with the rethreshing rotor;

drawing air through the suction plenum and across the rethreshed tailings to separate chaff from the rethreshed grain; and discharging the chaff from the grain combine.

\* \* \* \* \*